US011795314B2

(12) United States Patent
Lee et al.

(10) Patent No.: US 11,795,314 B2
(45) Date of Patent: Oct. 24, 2023

(54) ENCAPSULATING COMPOSITION

(71) Applicant: LG CHEM, LTD., Seoul (KR)

(72) Inventors: Seung Min Lee, Daejeon (KR); So Young Kim, Daejeon (KR); Se Woo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 887 days.

(21) Appl. No.: 16/646,522

(22) PCT Filed: Sep. 4, 2018

(86) PCT No.: PCT/KR2018/010288
§ 371 (c)(1),
(2) Date: Mar. 11, 2020

(87) PCT Pub. No.: WO2019/054687
PCT Pub. Date: Mar. 21, 2019

(65) Prior Publication Data
US 2020/0270438 A1    Aug. 27, 2020

(30) Foreign Application Priority Data

Sep. 12, 2017   (KR) .................. 10-2017-0116534

(51) Int. Cl.
| C08L 23/22 | (2006.01) |
| C08F 20/06 | (2006.01) |
| C08K 3/013 | (2018.01) |
| C08K 5/00 | (2006.01) |
| C08K 5/1515 | (2006.01) |

(52) U.S. Cl.
CPC .............. *C08L 23/22* (2013.01); *C08F 20/06* (2013.01); *C08K 3/013* (2018.01); *C08K 5/0025* (2013.01); *C08K 5/1515* (2013.01); *C08K 2201/006* (2013.01); *C08L 2203/206* (2013.01)

(58) Field of Classification Search
CPC .... C08L 23/22; C08L 2203/206; C08F 20/06; C08K 3/013; C08K 5/0025; C08K 5/1515; C08K 2201/006
See application file for complete search history.

(56) References Cited

U.S. PATENT DOCUMENTS

| 6,042,943 | A | 3/2000 | Levy | |
| 10,336,919 | B2 | 7/2019 | Shim et al. | |
| 10,355,239 | B2 | 7/2019 | Yoo et al. | |
| 2009/0026934 | A1 | 1/2009 | Fujita et al. | |
| 2016/0362587 | A1* | 12/2016 | Aoyama | ............... H01L 23/293 |
| 2018/0072919 | A1* | 3/2018 | Kim | .......................... C09J 11/04 |

FOREIGN PATENT DOCUMENTS

| CN | 1662621 A | 8/2005 | |
| CN | 1732193 A | 2/2006 | |
| CN | 101297011 A | 10/2008 | |
| CN | 102295890 A | 12/2011 | |
| CN | 105073900 A | 11/2015 | |
| CN | 105143377 A | 12/2015 | |
| CN | 106463647 A | 2/2017 | |
| EP | 2361958 A1 | 8/2011 | |
| JP | 2013188924 | 9/2013 | |
| JP | 2013188924 A | 9/2013 | |
| JP | 2014156566 | 8/2014 | |
| JP | 2014156566 A | 8/2014 | |
| KR | 10-20080088606 | 10/2008 | |
| KR | 101481417 B1 * | 1/2015 | |
| KR | 10-20160089679 | 7/2016 | |
| KR | 10-1740184 | 5/2017 | |
| KR | 10-1742425 | 5/2017 | |
| WO | WO-2015129416 A1 * | 9/2015 | ............ C08F 290/04 |
| WO | 2016126128 A1 | 8/2016 | |
| WO | WO-2016153292 A1 * | 9/2016 | ............ C08K 5/0025 |

OTHER PUBLICATIONS

Aerosil R972 Data Sheet (Year: 2022).*
English language machine translation of KR 101481417 (Year: 2015).*
Office Action of Chinese Patent Office in Appl'n. No. 201880059246. 2, dated Jan. 6, 2022.

* cited by examiner

*Primary Examiner* — Angela C Scott
(74) *Attorney, Agent, or Firm* — Bryan Cave Leighton Paisner LLP

(57) ABSTRACT

Provided is a composition for encapsulating an organic electronic element, comprising an olefin-based resin having at least one reactive functional group, a multifunctional acrylic oligomer, and a monofunctional acrylic oligomer, wherein the monofunctional acrylic oligomer is present in an amount of 7 to 30 parts by weight relative to 100 parts by weight of the olefin-based resin. Also provided are an organic electronic device comprising the composition, and methods for preparing the organic electronic device.

20 Claims, 1 Drawing Sheet

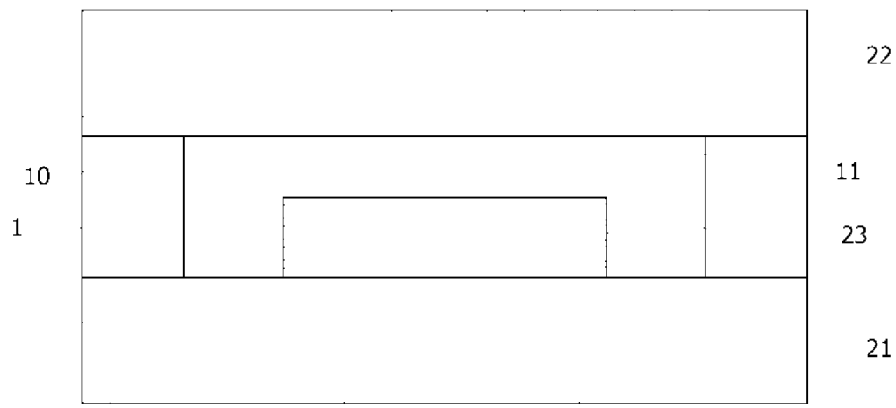

ENCAPSULATING COMPOSITION

CROSS-REFERENCE TO RELATED APPLICATIONS

This application is a National Stage of International Application No. PCT/KR2018/010288 filed on Sep. 4, 2017, which claims the benefit of priority to Korean Patent Application No. 10-2017-0116534 filed on Sep. 12, 2017, the disclosure of which is incorporated herein by reference in its entirety.

TECHNICAL FIELD

The present application relates to a composition for encapsulating an organic electronic element, an organic electronic device comprising the same, and a method for preparing the organic electronic device.

BACKGROUND

An organic electronic device (OED) means a device comprising an organic material layer that generates alternate current of charges using holes and electrons, and an example thereof can include a photovoltaic device, a rectifier, a transmitter and an organic light emitting diode (OLED), and the like.

The organic light emitting diode (OLED) among the above organic electronic devices has less power consumption and faster response speed than existing light sources, and is advantageous for thinning of a display device or illumination. In addition, the OLED has spatial usability and thus is expected to be applied in various fields covering various portable devices, monitors, notebooks, and TVs.

In commercialization and application expansion of the OLED, the most important problem is a durability problem. Organic materials and metal electrodes, and the like contained in the OLED are very easily oxidized by external factors such as moisture. Thus, products containing OLEDs are highly sensitive to environmental factors. Accordingly, various methods have been proposed in order to effectively block infiltration of oxygen or moisture from the outside to the organic electronic device such as the OLED.

Patent Document 1 relates to an adhesive encapsulating composition film and an organic electroluminescence device, where the pressure-sensitive adhesive based on PIB (polyisobutylene) which is an olefin-based resin has poor processability and poor reliability under high temperature and high humidity conditions.

PRIOR ART DOCUMENTS

Patent Documents (Patent Document 1) Korean Laid-open Patent Publication No. 2008-0088606

DISCLOSURE

Technical Problem

The present application provides an encapsulating composition which enables formation of a sealing structure capable of effectively blocking moisture or oxygen introduced into the organic electronic device from the outside to secure a lifetime of an organic electronic device, and exhibits a slight change over time upon exposure to a light source such as an illumination in mass production in a process of forming a sealing structure of an organic electronic device and accordingly, has excellent processability, and an organic electronic device comprising the same.

Technical Solution

The present application relates to an encapsulating composition. The encapsulating composition can be an encapsulant applied to seal or encapsulate an organic electronic device such as, for example, an OLED. In one example, the encapsulating composition of the present application can be applied to seal or encapsulate at least one side of an organic electronic device. Thus, after the encapsulating composition is applied to the encapsulation, it can be present at the periphery of the organic electronic device.

In this specification, the term "organic electronic device" means an article or device having a structure comprising an organic material layer that generates alternate current of charges using holes and electrons between a pair of electrodes facing each other, and an example thereof can include, but is not limited to, a photovoltaic device, a rectifier, a transmitter and an organic light emitting diode (OLED), and the like. In one example of the present invention, the organic electronic device can be an OLED.

An exemplary composition for encapsulating an organic electronic element can comprise an olefin-based resin having at least one reactive functional group, a multifunctional acrylic oligomer and a monofunctional acrylic oligomer. The monofunctional acrylic oligomer can be included in an amount of 7 to 30 parts by weight, 7.2 to 28 parts by weight, 7.3 to 26 parts by weight, 7.5 to 24 parts by weight or 7.6 to 22 parts by weight relative to 100 parts by weight of the olefin-based resin. Hereinafter, the term "part by weight" herein can mean a weight ratio between the respective components. By comprising the multifunctional acrylic oligomer and the monofunctional acrylic oligomer together with the olefin-based resin, the present application provides an encapsulating composition which has excellent moisture barrier properties and storage stability against light exposure while ensuring heat resistant durability at high temperature and high humidity.

In an embodiment of the present application, the encapsulating composition can comprise an olefin-based resin comprising at least one reactive functional group. The olefin-based resin can have a water vapor transmission rate of 50 $g/m^2 \cdot day$ or less. Considering that the encapsulating composition of the present application is applied to seal or encapsulate an organic electronic device, it can provide an excellent moisture barrier property by comprising the olefin-based resin satisfying the above-mentioned water vapor transmission rate range. In this specification, the phrase "resin having a water vapor transmission rate of 50 $g/m^2 \cdot day$ or less" can mean a resin that in a state where the resin is prepared in the form of a film formed of a resin layer having any one thickness of 5 to 100 μm, the water vapor transmission rate measured with respect to the thickness direction of the film is measured to be 50 $g/m^2 \cdot day$ or less. The water vapor transmission rate is measured under 100° F. and 100% relative humidity, which can be 50 $g/m^2 \cdot day$ or less, 40 $g/m^2 \cdot day$ or less, 30 $g/m^2 \cdot day$ or less, 20 $g/m^2 \cdot day$ or less, or 10 $g/m^2 \cdot day$ or less. The lower the water vapor transmission rate, the more it can exhibit excellent moisture barrier properties, and thus the lower limit is not particularly limited, but can be, for example, 0 $g/m^2 \cdot day$ or 0.1 $g/m^2 \cdot day$.

Specifically, an exemplary olefin-based resin of the present application comprises an olefin-based resin derived from a mixture of monomers, where the mixture can have at least an isoolefin monomer component having 4 to 7 carbon atoms or a multiolefin monomer component. The isoolefin can be present, for example, in a range of 70 to 100 wt % or 85 to 99.5 wt % based on the total monomer weight. The multiolefin-derived component can be present in a range of 0.5 to 30 wt %, 0.5 to 15 wt % or 0.5 to 8 wt %.

The isoolefin can be exemplified by isobutylene, 2-methyl-1-butene, 3-methyl-1-butene, 2-methyl-2-butene, 1-butene, 2-butene, methyl vinyl ether, indene, vinyltrimethylsilane, hexene or 4-methyl-1-pentene. The multiolefin can have 4 to 14 carbon atoms, and for example, can be exemplified by isoprene, butadiene, 2,3-dimethyl-1,3-butadiene, myrcene, 6,6-dimethyl-fulvene, hexadiene, cyclopentadiene, or piperylene. Other polymerizable monomers, such as styrene and dichlorostyrene, can also be homopolymerized or copolymerized.

In the present application, the olefin-based resin can comprise an isobutylene-based homopolymer or copolymer. As mentioned above, the isobutylene olefin-based resin or polymer can mean an olefin-based resin or polymer containing 70 mol % or more of repeating units from isobutylene and one or more other polymerizable units.

In the present application, the olefin-based resin can be butyl rubber or branched butyl rubber. An exemplary olefin-based resin is unsaturated butyl rubber, such as a copolymer of olefin or isoolefin and multiolefin. The olefin-based resin included in the encapsulating composition of the present invention can be exemplified by poly(isobutylene-co-isoprene), polyisoprene, polybutadiene, polyisobutylene, poly(styrene-co-butadiene), natural rubber, butyl rubber and a mixture thereof. The olefin-based resins useful in the present application can be prepared by any suitable means known in the art, and the present invention is not limited by such a method of preparing a olefin-based resin.

In one example, the olefin-based resin can be a low molecular weight polyisobutylene resin. For example, the olefin-based resin can have a weight average molecular weight of 100,000 g/mol or less, 90,000 g/mol or less, or 70,000 g/mol or less, where the lower limit can be 500 g/mol or more, 1,000 g/mol or more, 10,000 g/mol or more, or 55,000 g/mol or more. By controlling the weight average molecular weight of the olefin-based resin in the above range, the present invention can realize an encapsulating composition suitable for application and encapsulation processes. The encapsulating composition can have a liquid phase form and can be suitably applied to side sealing application of an organic electronic device to be described below.

The reactive functional group included in the olefin-based resin can be a polar functional group. In addition, the reactive functional group can have reactivity with the above-mentioned acrylic oligomer or a reactive diluent to be described below. The kind of the reactive functional group is not particularly limited, but it can be, for example, an acid anhydride group, a carboxyl group, an epoxy group, an amino group, a hydroxyl group, an isocyanate group, an oxazoline group, an oxetane group, a cyanate group, a phenol group, a hydrazide group, or an amide group. An example of the olefin-based resin having a reactive functional group can include succinic anhydride-modified polyisobutylene, maleic anhydride-modified liquid polyisobutylene, maleic anhydride-modified liquid polyisoprene, epoxy-modified polyisoprene, hydroxyl group-modified liquid polyisoprene, or allyl-modified liquid polyisoprene. As such an olefin-based resin forms a crosslinked structure with the above-described acrylic oligomer or a reactive diluent to be described below, the present application can realize an encapsulating composition having desired physical properties such as a moisture barrier property and a handling property.

In one example, the encapsulating composition of the present application can comprise a multifunctional acrylic oligomer and a monofunctional acrylic oligomer. The multifunctional acrylic oligomer can contain two or more (meth) acryloyl groups, and the monofunctional acrylic oligomer can be a compound containing one (meth) acryloyl group. By comprising the multifunctional acrylic oligomer and the monofunctional acrylic oligomer, the present application can reduce the change over time upon light exposure at a low intensity to ensure storage stability while complementing low heat resistant durability at high temperature and high humidity of existing olefin-based resins.

The multifunctional acrylic oligomer or monofunctional acrylic oligomer can have a weight average molecular weight in a range of 500 g/mol to 50,000 g/mol, 600 g/mol to 40,000 g/mol, 700 g/mol to 30,000 g/mol, 800 g/mol to 20,000 g/mol or 900 g/mol to 15,000 g/mol. By comprising an oligomer having a weight average molecular weight in the above range, the present application can realize desired physical properties as the side sealing material. In this specification, the weight average molecular weight means a value converted to standard polystyrene measured by GPC (gel permeation chromatograph).

In one example, the multifunctional acrylic oligomer or monofunctional acrylic oligomer can comprise at least one or more curable functional groups. The curable functional group can comprise one or more heat-curable functional groups such as an epoxy group, a glycidyl group, an isocyanate group, a hydroxyl group, a carboxyl group or an amide group, or can comprise a functional group capable of being cured by irradiation with electromagnetic waves such as a urethane group, an epoxide group, a cyclic ether group, a sulfide group, an acetal group or a lactone group. In an embodiment of the present application, the multifunctional acrylic oligomer or monofunctional acrylic oligomer can comprise epoxy acrylate, urethane acrylate, silicone acrylate, aliphatic acrylate or polyester acrylate, but is not limited thereto.

In one example, the multifunctional acrylic oligomer can be included in an amount of 8 to 60 parts by weight, 10 to 50 parts by weight, 12 to 48 parts by weight, 13 to 44 parts by weight or 14 to 42 parts by weight relative to 100 parts by weight of the olefin-based resin. By adjusting the content of the multifunctional acrylic oligomer in the above range, the present application can complement low heat resistant durability at high temperature and high humidity of existing olefin-based resins.

In an embodiment of the present application, the encapsulating composition can further comprise a reactive diluent. The reactive diluent can have a weight average molecular weight of less than 500 g/mol, less than 450 g/mol, less than 300 g/mol, less than 350 g/mol or less than 300 g/mol. The lower limit is not particularly limited, but can be 10 g/mol or more or 50 g/mol or more. By comprising the reactive diluent, the present application realizes excellent application properties and processability in applying a sealing material on a substrate on which an organic electronic element is formed. In addition, as the reactive diluent is included, the present invention can prevent damage applied to the element by providing the encapsulating composition in a solventless type.

In one example, the reactive diluent can have a viscosity in a range of 500 cP or less or 50 cP to 300 cP as measured at a temperature of 25° C., a strain of 5% and a frequency of 1 Hz. By comprising the reactive diluent having a viscosity in the above range, the present application can secure processability in applying an encapsulating composition to the periphery of an organic electronic element.

The material of the reactive diluent is not particularly limited, which can comprise, for example, an epoxy compound, an oxetane compound or an acrylic monomer. The acrylic monomer can comprise a monofunctional acrylic compound or a multifunctional acrylic compound. The reactive diluent may not contain an olefin-based compound, and accordingly, it can be distinguished from the above-mentioned olefin-based resin.

In one example, as the reactive diluent, an aromatic or aliphatic; or linear or branched epoxy compound can be used. In one embodiment of the present invention, as one containing two or more functional groups, an epoxy compound having an epoxy equivalent of 50 g/eq to 350 g/eq or 100 g/eq to 300 g/eq can be used. In the present application, as the reactive diluent, an epoxy resin containing a cyclic structure in the molecular structure can be used, and for example, an alicyclic epoxy resin can be used. The alicyclic epoxy resin has excellent compatibility with an olefin-based resin or a reactive diluent and is cured without phase separation, so that it can realize uniform crosslinking of the composition.

Also, the linear or branched aliphatic epoxy compound can include aliphatic glycidyl ether, 1,4-butanediol diglycidyl ether, ethylene glycol diglycidyl ether, 1,6-hexanediol diglycidyl ether, propylene glycol diglycidyl ether, diethylene glycol diglycidyl ether, butyl glycidyl ether, 2-ethylhexyl glycidyl ether or neopentyl glycol diglycidyl ether, but is not limited thereto.

Furthermore, as long as the oxetane compound as the reactive diluent has an oxetane functional group, its structure is not limited, and for example, can be exemplified by OXT-221, CHOX, OX-SC, OXT101, OXT121, OXT221 or OXT212 from TOAGOSEI, or EHO, OXBP, OXTP or OXMA from ETERNACOLL.

In addition, as the reactive diluent, the acrylic monomer can include polybutadiene dimethacrylate, 1,4-butanediol di(meth)acrylate, 1,3-butylene glycol di(meth)acrylate, 1,6-hexanediol di(meth)acrylate, 1,8-octanediol di(meth)acrylate, 1,12-dodecanediol di(meth)acrylate, neopentyl glycol di(meth)acrylate, dicyclopentanyl di(meth)acrylate, cyclohexane-1,4-dimethanol di(meth)acrylate, tricyclodecanedimethanol (meth)diacrylate, dimethylol di cyclopentane di(meth)acrylate, neopentyl glycol-modified trimethylpropane di(meth)acrylate, adamantane di(meth)acrylate, trimethylolpropane tri(meth)acrylate or a mixture thereof.

In an embodiment of the present application, the reactive diluent can be included in an amount of 10 to 50 parts by weight, 12 to 48 parts by weight, 13 to 44 parts by weight or 14 to 42 parts by weight relative to 100 parts by weight of the olefin-based resin. The present application can improve the application properties of the encapsulating composition in the above content range.

When the composition for encapsulating an organic electronic element of the present application comprises the reactive diluent and thus comprises the olefin-based resin, the multifunctional acrylic oligomer, the monofunctional acrylic oligomer and the reactive diluent together, the respective components can be included in weight ratios of 45 to 75 parts by weight, 8 to 21 parts by weight, 3 to 15 parts by weight and 1 to 21 parts by weight; or 48 to 72 parts by weight, 9 to 20.5 parts by weight, 4 to 12 parts by weight and 8 to 20.5 parts by weight, respectively. By compounding the respective components in the above ratios, the present application can provide a composition capable of forming the intended sealing structure in the present application.

In one example, the encapsulating composition can further comprise an inorganic filler. The inorganic filler can be included to control a thixotropic property of the encapsulating composition separately from a moisture adsorbent to be described below. In the present application, the specific kind of the usable filler is not particularly limited, and for example, one or a mixture of two or more of silica, calcium carbonate, alumina or talc, and the like can be used.

In the present application, in order to improve bonding efficiency between the filler and the organic binder, a product surface-treated with an organic material can also be used as the filler, or a coupling agent can further be added and used.

The encapsulating composition of the present application can contain 0.1 parts by weight to 30 parts by weight, 1 part by weight to 28 parts by weight, or 3 parts by weight to 23 parts by weight of the inorganic filler relative to 100 parts by weight of the olefin-based resin. By controlling the content of the inorganic filler in the above range, the present application can provide an encapsulant in which the intended sealing structure shape in the present application can be easily realized.

Furthermore, the BET surface area of the inorganic filler can be in a range of 35 to 500 $m^2/g$, 40 to 400 $m^2/g$, 50 to 300 $m^2/g$, or 60 to 200 $m^2/g$. The specific surface area has been measured using the BET method, and specifically, it can be measured by adding, as a sample, 1 g of the inorganic filler to a tube with ASAP2020 (Micromeritics, USA) without pretreatment at −195° C. The average value can be obtained by measuring the same sample three times. By controlling the specific surface area of the inorganic filler in the above range, the present application can provide an encapsulant in which the intended sealing structure shape in the present application can be easily realized.

In addition, in an embodiment of the present application, the encapsulating composition can comprise a curing agent, if necessary. The curing agent can be a thermal curing agent or a photo-curing agent. For example, a suitable type of curing agent can be selected and used depending on the types of functional groups contained in the olefin-based resin, the acrylic oligomer or the reactive diluent, and one or more curing agents can be used.

In one example, in the case of containing an epoxy group, the curing agent is an epoxy curing agent known in the art, and for example, one or two or more of an amine curing agent, an imidazole curing agent, a phenol curing agent, a phosphorus curing agent or an acid anhydride curing agent, and the like can be used, without being limited thereto.

In one example, as the curing agent, an imidazole compound which is solid at room temperature and has a melting point or a decomposition temperature of 80° C. or higher can be used. As such a compound, for example, 2-methylimidazole, 2-heptadecylimidazole, 2-phenylimidazole, 2-phenyl-4-methylimidazole or 1-cyanoethyl-2-phenylimidazole, and the like can be exemplified, but is not limited thereto.

In an embodiment of the present application, the curing agent can be a latent thermal curing agent such as an imidazole-isocyanuric acid adduct, an amine-epoxy adduct, a boron trifluoride-amine complex or encapsulated imidazole. That is, in the present invention, light irradiation can proceed first in the curing step of the encapsulating composition to control the initial fluidity, and the curing agent can be completely cured as a latent curing agent in a final curing step after light irradiation.

The content of the curing agent can be selected depending on the composition of the composition, for example, the kind or ratio of the resin. For example, the curing agent can be included in an amount of 1 part by weight to 100 parts by weight, 1 part by weight to 90 parts by weight or 1 part by weight to 80 parts by weight relative to 100 parts by weight of the olefin-based resin. The weight ratio can be adjusted depending on the kind and ratio of the functional group of the olefin-based resin, the acrylic oligomer or the reactive diluent, or the crosslinking density to be implemented.

In an embodiment of the present application, the encapsulating composition can comprise an initiator. As the initiator, for example, a cationic initiator or a photo-radical initiator can be included.

The cationic initiator can be a cationic photopolymerization initiator, and for example, ionized cationic initiators of onium salt or organometallic salt series, or nonionized cationic photopolymerization initiators of organic silane or latent sulfonic acid series can be used. As the initiator of the onium salt series, diaryliodonium salt, triarylsulfonium salt or aryldiazonium salt, and the like can be exemplified, as the initiator of the organometallic salt series, iron arene and the like can be exemplified, as the initiator of the organosilane series, o-nitrobenzyl triaryl silyl ether, triaryl silyl peroxide or acyl silane, and the like can be exemplified, and as the initiator of the latent sulfuric acid series, α-sulfonyloxy ketone or α-hydroxymethylbenzoin sulfonate, and the like can be exemplified, without being limited thereto.

The radical initiator can be a photo-radical initiator. The specific kind of the photoinitiator can be appropriately selected in consideration of curing rate and yellowing possibility, and the like. For example, benzoin-based, hydroxy ketone-based, amino ketone-based or phosphine oxide-based photoinitiators, and the like can be used, and specifically, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone] and 2,4,6-trimethylbenzoyl-diphenyl-phosphine oxide, and the like can be used.

The content of the photo-radical initiator can be changed depending on the kind and ratio of the functional group in the radical photocurable compound, the crosslinking density to be implemented, and the like. For example, the photo-radical initiator can be compounded in a ratio of 3 parts by weight to 15 parts by weight or 6 parts by weight to 12 parts by weight relative to 100 parts by weight of the olefin-based resin. By comprising the photo-radical initiator in the above content range, the present invention can introduce an appropriate crosslinked structure into the encapsulating composition to realize flow control at a high temperature.

In one example, the initiator can comprise a cationic initiator and a radical initiator together, where the cationic initiator can be included in an amount of 0.01 to 5 parts by weight, 0.1 to 4 parts by weight, 0.3 to 2 parts by weight or 0.5 to 1.5 parts by weight relative to 100 parts by weight of the olefin-based resin and the radical initiator can be included in an amount of 3 to 15 parts by weight, 4 to 13 parts by weight, 5 to 12 parts by weight, 6 to 11 parts by weight or 7 to 11.5 parts by weight relative to 100 parts by weight of the olefin-based resin. In one example, the radical initiator content of the present application can be greater than the cationic initiator content. By controlling the above content range, the present application can realize a proper crosslinked structure in the encapsulating composition to improve heat resistant durability at high temperature and high humidity.

The encapsulating composition of the present application can further comprise a moisture adsorbent. The term "moisture adsorbent" can be used to collectively mean a component capable of adsorbing or removing moisture or moisture introduced from the outside through physical or chemical reaction or the like. That is, it means a moisture-reactive adsorbent or a physical adsorbent, and a mixture thereof is also usable.

The moisture-reactive adsorbent chemically reacts with humidity, moisture or oxygen, and the like introduced into the resin composition or the cured product thereof to adsorb moisture or humidity. The physical adsorbent can lengthen the moving path of moisture or humidity penetrating into the resin composition or the cured product thereof to inhibit the penetration and can maximize the barrier property against moisture or humidity through the matrix structure of the resin composition or the cured product thereof and interaction with the moisture-reactive adsorbent or the like.

In the present application, the specific kind of the usable moisture adsorbent is not particularly limited, and for example, in the case of the moisture-reactive adsorbent, it can include one or a mixture of two or more of a metal oxide, a metal salt or phosphorus pentoxide ($P_2O_5$), and the like; and in the case of the physical adsorbent, it can include zeolite, zirconia or montmorillonite, and the like.

Here, a specific example of the metal oxide can include lithium oxide ($Li_2O$), sodium oxide ($Na_2O$), barium oxide (BaO), calcium oxide (CaO) or magnesium oxide (MgO), and the like, and an example of the metal salt can include a sulfate such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$) or nickel sulfate ($NiSO_4$), a metal halogenide such as calcium chloride ($CaCl_2$), magnesium chloride ($MgCl_2$), strontium chloride ($SrCl_2$), yttrium chloride ($YCl_3$), copper chloride ($CuCl_2$), cesium fluoride (CsF), tantalum fluoride ($TaF_5$), niobium fluoride ($NbF_5$), lithium bromide (LiBr), calcium bromide ($CaBr_2$), cesium bromide ($CeBr_3$), selenium bromide ($SeBr_4$), vanadium bromide ($VBr_3$), magnesium bromide ($MgBr_2$), barium iodide ($BaI_2$) or magnesium iodide ($MgI_2$); or a metal chlorate such as barium perchlorate ($Ba(ClO_4)_2$) or magnesium perchlorate ($Mg(ClO_4)_2$), and the like, but is not limited thereto.

In the present application, the moisture adsorbent such as the metal oxide can be compounded in the composition in a properly processed state. For example, a pulverization process of the moisture adsorbent can be required, and a process such as a three-roll mill, a bead mill or a ball mill can be used for pulverizing the moisture adsorbent.

The encapsulating composition of the present application can comprise the moisture adsorbent in an amount of 5 parts by weight to 100 parts by weight, 5 to 90 parts by weight, 5 parts by weight to 80 parts by weight or 10 to 55 parts by weight relative to 100 parts by weight of the olefin-based resin. As the encapsulating composition of the present application preferably controls the content of the moisture adsorbent to 5 parts by weight or more, the encapsulating composition or the cured product thereof can exhibit excellent moisture and humidity barrier properties. In addition, when the content of the moisture adsorbent is controlled to 100 parts by weight or less to form a thin film sealing structure, it can exhibit excellent moisture barrier properties.

In one example, the encapsulating composition can be in a liquid phase at room temperature, for example, at about 25° C. In an embodiment of the present application, the encapsulating composition can be in a solventless type liquid phase. The encapsulating composition can be applied to encapsulate an organic electronic element, and specifically, can be applied to encapsulate sides of an organic electronic element. As the encapsulating composition has a liquid form at room temperature, the present application can encapsulate an organic electronic element by a method of applying the composition to the side of the element.

In an embodiment of the present application, a process of applying a liquid composition is performed in sealing sides of an organic electronic element, whereas conventionally, there has been a problem that since the composition has high fluidity after application, it is difficult to maintain the desired encapsulation shape. The present application performs pre-curing by irradiating the encapsulating composition applied at a desired position with light, so that the final curing can proceed after the fluidity is controlled. Accordingly, the present application can keep the applied encapsulating composition in the desired encapsulated shape until final curing. That is, as the encapsulating composition comprises the above-described specific composition, the present application can introduce a double-curing method, whereby the flow control at a high temperature is possible after the encapsulating composition is applied.

The encapsulating composition according to the present application can comprise various additives within the range without affecting the above-mentioned effects of invention, in addition to the above-mentioned configurations. For example, the resin composition can comprise a defoamer, a coupling agent, a tackifier, a ultraviolet stabilizer or an antioxidant, and the like in an appropriate range of content depending on the desired physical properties. In one example, the encapsulating composition can further comprise a defoamer. By comprising the defoamer, the present application can realize defoaming characteristics in the above-described process of applying the encapsulating composition to provide a reliable sealing structure. Also, the kind of the defoamer is not particularly limited as long as the physical properties of the encapsulating composition required in the present application are satisfied.

In one example, the encapsulating composition can be a pressure-sensitive adhesive composition or an adhesive composition. Accordingly, the encapsulating composition can also serve as a structural adhesive for attaching the substrate on which the organic electronic element is formed and a cover substrate on the element.

In an embodiment of the present application, the exemplary encapsulating composition can satisfy Equation 1 below:

$$V/V_0 \leq 1.4 \quad \text{[Equation 1]}$$

In Equation 1 above, V is the viscosity of the encapsulating composition after irradiation with light of 100 mJ/cm² at a wavelength of 395 nm and an intensity of 100 mW/cm², and $V_0$ is the viscosity of the encapsulating composition before irradiation with the light, where the viscosity is a viscosity measured at a temperature of 25° C., a strain of 5% and a frequency of 1 Hz.

By controlling the viscosity difference before and after the light irradiation, the present application provides a composition which suppresses the change over time of the encapsulating composition over time due to low-intensity illumination in mass production of the composition, and thus has excellent storage stability. The $V/V_0$ is not limited to the above range, which can be in a range of 0.8 to 1.3 or 0.95 to 1.1.

The present application also relates to an organic electronic device. An exemplary organic electronic device can comprise, as shown in FIG. 1, a substrate (21), an organic electronic element (23) formed on the substrate (21), and a side sealing layer (10) formed on the periphery of the substrate (21) so as to surround the side of the organic electronic element (23) and including the above-described encapsulating composition (1). Furthermore, the exemplary organic electronic device can further comprise a top sealing layer (11) covering the entire surface of the organic electronic element (23).

The top sealing layer and the side sealing layer can be present on the same plane. Here, the "same" can mean substantially the same. For example, in the same plane, the substantially the same means that it can have an error within ±5 μm or ±1 μm in the thickness direction. The top sealing layer can seal the upper surface of the element, and can seal the side surfaces together as well as the upper surface. The side sealing layer can be formed on the side surface of the element, but may not directly contact the side surface of the organic electronic element. For example, the top sealing layer can be sealed so as to directly contact with the upper surface and side surfaces of the element. That is, the side sealing layer can be located, in the plan view of the organic electronic device, at the periphery of the substrate without contacting the element.

In this specification, the term "periphery" means the edge portion of the perimeter. That is, the periphery of the substrate herein can mean the edge portion of the perimeter in the substrate.

The material constituting the side sealing layer is not particularly limited, but can comprise the encapsulating composition as described above.

On the other hand, the top sealing layer can comprise a sealing resin, where the sealing resin can be exemplified by an acrylic resin, an epoxy resin, a silicone resin, a fluorine resin, a styrene resin, a polyolefin resin, a thermoplastic elastomer, a polyoxyalkylene resin, a polyester resin, a polyvinyl chloride resin, a polycarbonate resin, a polyphenylene sulfide resin, a polyamide resin or a mixture thereof, and the like. The components constituting the top sealing layer can be the same as or different from those of the encapsulating composition as described above. However, the top sealing layer can contain no or a small amount of the above-mentioned moisture adsorbent in that the top sealing layer is in direct contact with the element. For example, the top sealing layer can contain 0 to 20 parts by weight of the moisture adsorbent relative to 100 parts by weight of the sealing resin.

In one example, the organic electronic element can comprise a reflective electrode layer formed on a substrate, an organic layer formed on the reflective electrode layer and including at least a light emitting layer, and a transparent electrode layer formed on the organic layer.

In the present application, the organic electronic element (23) can be an organic light emitting diode.

In one example, the organic electronic device according to the present application can be in a top emission type, but is not limited thereto, and can be applied to a bottom emission type.

The organic electronic element can further comprise a pair of electrodes (a reflective electrode layer and a transparent electrode layer) and a protective film for protecting the organic layer. The protective film can be referred to as a passivation film, which can be in a form in which organic films and inorganic films are alternately laminated.

The present application also relates to a method for preparing an organic electronic device.

In one example, the method can comprise a step of applying the above-described encapsulating composition (1) on the periphery of the substrate (21), on which the organic electronic element (23) is formed, so as to surround the side of the organic electronic element (23). The step of applying the encapsulating composition can be a step of forming the side sealing layer (10) as described above.

Specifically, the step of forming a side sealing layer can comprise a step of applying the above-described encapsulating composition so as to surround the side of the organic electronic element (23), and can further comprise a step of curing the encapsulating composition. The step of curing the encapsulating composition can comprise a step of irradiating it with light and/or a step of applying heat. In one example, the encapsulating composition can be cured through only one step of light irradiation, but is not so limited thereto, and can comprise a pre-curing step and a final curing step. The pre-curing step can comprise irradiating it with light, and the final curing step can comprise irradiating it with light or applying heat.

Here, the substrate (21) on which an organic electronic element (23) is formed can be prepared by forming a reflective electrode or a transparent electrode on a substrate (21) such as glass or a film by a method such as vacuum deposition or sputtering, and forming an organic material layer on the reflective electrode. The organic material layer can comprise a hole injecting layer, a hole transporting layer, a light emitting layer, an electron injecting layer and/or an electron transporting layer. Subsequently, a second electrode is further formed on the organic material layer. The second electrode can be a transparent electrode or a reflective electrode. Then, the above-described side sealing layer (10) is applied on the periphery of the substrate (21) so as to cover the side of the organic electronic element (23). At this time, the method of forming a side sealing layer (10) is not particularly limited, and the above-described encapsulating composition can be applied on the side of the substrate (21) using a process such as screen printing or dispenser applying. Furthermore, a top sealing layer (11) for encapsulating the entire surface of the organic electronic element (23) can be applied. As the method of forming a top sealing layer (11), a known method in the art can be applied, and for example, a liquid drop injection (one drop fill) process can be used.

In addition, in the present invention, a curing process can also be performed on the top or side sealing layer for sealing the organic electronic element, where this curing process (final curing) can proceed, for example, in a heating chamber or a UV chamber, and preferably in both. The conditions upon the final curing can be appropriately selected in consideration of the stability of the organic electronic device, and the like.

In one example, after the above-described encapsulating composition is applied, the composition can be irradiated with light to induce crosslinking. The light irradiation can comprise irradiating it with light having a wavelength range of the UV-A region band at a light quantity of 0.3 to 6 $J/cm^2$ or a light quantity of 0.5 to 4 $J/cm^2$. As described above, it is possible to realize a sealing structure shape that can become a basis by pre-curing it through irradiation of light.

In one example, the method can comprise finally curing the encapsulating composition pre-cured after light irradiation. The final curing can further comprise heat-curing it at a temperature of 40° C. to 200° C., 50° C. to 150° C. or 70° C. to 120° C. for 1 hour to 24 hours, 1 hour to 20 hours, 1 hour to 10 hours or 1 hour to 5 hours. Also, the final curing can comprise irradiating it with light having a wavelength range of the UV-A region band at a light quantity of 0.3 to 6 $J/cm^2$ or a light quantity of 0.5 to 4 $J/cm^2$. The final curing of the encapsulating composition can proceed through the step of applying heat or the step of irradiating it with light.

Advantageous Effects

The present application provides an encapsulating composition which enables formation of a sealing structure capable of effectively blocking moisture or oxygen introduced into the organic electronic device from the outside to secure a lifetime of an organic electronic device, and exhibits a slight change over time upon exposure to a light source such as an illumination in mass production in a process of forming a sealing structure of an organic electronic device and accordingly, has excellent processability, and an organic electronic device comprising the same.

BRIEF DESCRIPTION OF DRAWINGS

FIG. 1 is a cross-sectional view showing an organic electronic device according to one example of the present invention.

EXPLANATION OF REFERENCE NUMERALS

1: encapsulating composition
10: side sealing layer
11: top sealing layer
21: substrate
22: cover substrate
23: organic electronic element

DETAILED DESCRIPTION

Hereinafter, the present invention will be described in more detail by way of examples according to the present invention and comparative examples not according to the present invention, but the scope of the present invention is not limited by the following examples.

Hereinafter, in Examples and Comparative Examples, as the olefin-based resin, an acid anhydride-modified polyisobutylene resin (BASF, Mn 1000 g/mol, Glissopal SA, hereinafter PIBSA) and polyisobutylene (B14 from BASF, Mw=60,000 g/mol, hereinafter PIB) were used. As the bifunctional (multifunctional) acrylic oligomer, epoxy acrylate (Sartomer, CN110, Mw 870 g/mol) and urethane acrylate (Sartomer, CN 9013, Mw 19,500 g/mol) were used and as the monofunctional acrylic oligomer, epoxy acrylate (Sartomer, CN131, Mw 810 g/mol) and polyester acrylate (Sartomer, CN3108, Mw 8700 g/mol) were used. As the reactive diluent, an alicyclic epoxy resin (Daicel, Celloxide2021P, epoxy equivalent 130 g/eq, viscosity 250 cPs, Mw: 270 g/mol, hereinafter C2021P), an oxetane compound (OXT-212 from TOAGOSEI, Mw: 228.4 g/mol) and 1,6-hexanediol diacrylate (HDDA, Mw 226.3 g/mol) were used. As the inorganic filler, fumed silica (Aerosil, Evonik, R805, particle size 10 to 20 nm, BET=150 m$^2$/g) was used and as the moisture adsorbent, calcium oxide (CaO, Aldrich) was used. As the photoinitiator, a photo-cationic initiator (San-apro, CPI-101A) and a radical initiator (BASF, Irgacure 819, hereinafter Irg819) were used.

Examples 1 to 5 and Comparative Examples 1 to 4

For the above composition, components were compounded in the weight ratios as shown in Table 1 below and introduced into a mixing vessel. In the mixing vessel, a uniform composition solution was prepared using a planetary mixer (Kurabo, KK-250s).

TABLE 1

|  |  | Example |  |  |  |  | Comparative Example |  |  |  |
|---|---|---|---|---|---|---|---|---|---|---|
|  |  | 1 | 2 | 3 | 4 | 5 | 1 | 2 | 3 | 4 |
| Olefin-based Resin | PIBSA | 65 | 70 | 50 | 65 | 65 | 65 | 60 | 72 | — |
|  | PIB | — | — | — | — | — | — | — | — | 60 |
| Multifunctional Oligomer | CN110 | 15 | — | — | 22 | 15 | 20 | 10 | — | — |
|  | CN9013 | — | 10 | 20 | — | — | — | — | 10 | 15 |
| Monofunctional Oligomer | CN131 | 5 | — | — | — | 5 | — | 20 | 5 | — |
|  | CN3108 | — | 10 | 10 | 8 | — | — | — | — | 10 |
| Reactive Diluent | C2021P | 15 | — | 10 | 10 | 22 | 10 | 10 | 10 | — |
|  | OXT-212 | — | 10 | 10 | — | — | — | — | 3 | 15 |
|  | HDDA | — | — | — | 5 | — | 5 | — | — | — |
| Inorganic Filler | R805 | 5 | 8 | 10 | 5 | 5 | 5 | 5 | 8 | — |
| Moisture Adsorbent | CaO | 25 | 25 | 25 | 25 | 25 | 25 | 25 | 25 | 25 |
| Initiator | CPI-101A | 0.5 | 0.5 | 0.5 | 0.5 | 0.5 | 0.5 | 0.5 | 0.5 | 0.5 |
|  | Irg819 | 5 | 5 | 5 | 5 | 5 | 5 | 5 | 5 | 5 |

Hereinafter, the physical properties in Examples and Comparative Examples were evaluated in the following manner.

1. Viscosity Measurement

The viscosity of the encapsulating compositions prepared in Examples and Comparative Examples was measured using ARES G2 as a viscometer from TA as follows.

For the prepared encapsulating compositions, viscosity values at 1 Hz were each measured by frequency sweep using an 8 mm aluminum plate at a temperature of 25° C., a cell gap of 0.3 mm and a strain of 5%.

2. UV Exposure Stability

The encapsulating composition solutions prepared in Examples or Comparative Examples were each applied on a soda-lime glass to a thickness of 200 μm using a coating bar and irradiated with light of 100 mJ/cm$^2$ at an intensity of 100 mW/cm$^2$ using an LED 395 nm light source. Thereafter, viscosity values at 1 Hz were each measured by frequency sweep using an 8 mm aluminum plate at a temperature of 25° C., a cell gap of 0.3 mm and a strain of 5% (ARES-G2 from TA).

The viscosity before light irradiation was defined as $V_0$ and the viscosity after light irradiation was defined as V, and then they were substituted into Equation 1 below, where in the case of being 1.4 or less, it was classified as excellent in stability.

$$V/V_0 \leq 1.4 \quad \text{[Equation 1]}$$

3. Heat Resistance and Moisture Resistance

The encapsulating composition solutions prepared in Examples or Comparative Examples were each applied on a 0.7 T soda-lime glass to a layer of 200 μm using a coating bar. Then, a sample was prepared by laminating it with the same glass, the encapsulating composition was irradiated with light (metal halide lamp) having a wavelength range of the UV-A region band at a light quantity of 3 J/cm$^2$ and then, heat was applied thereto in an oven at 100° C. for 3 hours. Then, the sample was held in a constant temperature and humidity chamber at 85° C. and 85% relative humidity for about 1000 hours.

The measurement of heat resistance was indicated as O in the case where there was no change in the inside and the side of the coating region and X in the case where voids occurred inside the coating region.

The measurement of moisture resistance was indicated as O in the case where there was no lifting of the region penetrated with moisture, Δ in the case where the glass was lifted due to the moisture penetration site and X in the case where the glass was peeled off due to the moisture penetration site.

4. Moisture Barrier Property

Calcium was deposited to a size of 5 mm×5 mm and a thickness of 100 nm on a glass substrate having a size of 100 mm×100 mm and the encapsulating compositions of Examples and Comparative Examples were each applied to the edge part excluding the calcium. After it was laminated with a cover glass having a size of 100 mm×100 mm in the coated state, UV irradiation was performed at a light quantity of 3 J/cm$^2$ using a metal halide light source, and then heat was applied thereto in an oven at 100° C. for 1 hour. The obtained specimens were observed in a constant temperature and humidity chamber at 85° C. and 85% relative humidity to observe the time when calcium began to become transparent by oxidation reaction due to moisture penetration. It was indicated as O in the case where the transparency start time was 850 hours or more, Δ in the case where the transparency start time was less than 850 hours and 500 hours or more, and X in the case where the transparency start time was less than 500 hours.

TABLE 2

|  | Viscosity | UV exposure stability | Moisture resistance/Heat resistance | Moisture barrier property |
|---|---|---|---|---|
| Example 1 | 240,000 cP | 1.06 | O/O | O |
| Example 2 | 275,000 cP | 1.04 | O/O | O |
| Example 3 | 260,000 cP | 1.09 | O/O | O |
| Example 4 | 320,000 cP | 1.37 | Δ/O | O |
| Example 5 | 180,000 cP | 1.07 | Δ/O | Δ |

TABLE 2-continued

| | Viscosity | UV exposure stability | Moisture resistance/Heat resistance | Moisture barrier property |
|---|---|---|---|---|
| Comparative Example 1 | 235,000 cP | 1.45 | ◯/◯ | ◯ |
| Comparative Example 2 | 267,000 cP | 1.06 | ◯/◯ | X |
| Comparative Example 3 | 270,000 cP | 1.05 | ◯/X | ◯ |
| Comparative Example 4 | 480,000 cP | 1.09 | X/X | X |

The invention claimed is:

1. A composition for encapsulating an organic electronic element, comprising:
 an olefin-based resin having at least one reactive functional group;
 a multifunctional acrylic oligomer; and
 a monofunctional acrylic oligomer,
 wherein the multifunctional acrylic oligomer or monofuctional acrylic oligomer comprises at least one curable functional group, and
 wherein the monofunctional acrylic oligomer is present in an amount of 7 to 30 parts by weight relative to 100 parts by weight of the olefin-based resin.

2. The composition for encapsulating an organic electronic element according to claim 1, wherein the olefin-based resin has a weight average molecular weight of 100,000 g/mol or less.

3. The composition for encapsulating an organic electronic element according to claim 1, wherein the reactive functional group comprises an acid anhydride group, a carboxyl group, an epoxy group, an amino group, a hydroxyl group, an isocyanate group, an oxazoline group, an oxetane group, a cyanate group, a phenol group, a hydrazide group or an amide group.

4. The composition according to claim 1, wherein the multifunctional acrylic oligomer or the monofunctional acrylic oligomer has a weight average molecular weight in a range of 500 g/mol to 50,000 g/mol.

5. The composition according to claim 1, wherein the multifunctional acrylic oligomer is present in an amount of 8 to 60 parts by weight relative to 100 parts by weight of the olefin-based resin.

6. The composition according to claim 1, further comprising a reactive diluent.

7. The composition according to claim 6, wherein the reactive diluent has a weight average molecular weight of less than 500 g/mol.

8. The composition according to claim 6, wherein the reactive diluent comprises an epoxy compound, an oxetane compound or an acrylate monomer.

9. The composition according to claim 6, wherein the reactive diluent is present in an amount of 10 to 50 parts by weight relative to 100 parts by weight of the olefin-based resin.

10. The composition according to claim 6, wherein the olefin-based resin, the multifunctional acrylic oligomer, the monofunctional acrylic oligomer and the reactive diluent are present in weight ratios of 45 to 75 parts by weight, 8 to 21 parts by weight, 3 to 15 parts by weight and 1 to 21 parts by weight, respectively.

11. The composition according to claim 1, further comprising an inorganic filler.

12. The composition according to claim 11, wherein the inorganic filler has a BET specific surface area in a range of 35 $m^2$/g to 500 $m^2$/g.

13. The composition according to claim 11, wherein the inorganic filler is present in an amount of 0.1 parts by weight to 30 parts by weight relative to 100 parts by weight of the olefin-based resin.

14. The composition according to claim 1, comprising an initiator which comprises a cationic initiator or a radical initiator.

15. The composition according to claim 14, wherein the cationic initiator is present in an amount of 0.01 to 5 parts by weight relative to 100 parts by weight of the olefin-based resin, and the radical initiator is present in an amount of 3 to 15 parts by weight relative to 100 parts by weight of the olefin-based resin.

16. The composition according to claim 1, further comprising a moisture adsorbent.

17. The composition according to claim 1, satisfying Equation 1 below:

$$V/V_0 \leq 1.4 \qquad \text{[Equation 1]}$$

wherein V is the viscosity of the composition after irradiation with light of 100 mJ/$cm^2$ at a wavelength of 395 nm and an intensity of 100 mW/$cm^2$, $V_0$ is the viscosity of the composition before irradiation with the light, and the viscosity is measured at a temperature of 25° C., a strain of 5% and a frequency of 1 Hz.

18. An organic electronic device comprising:
 a substrate;
 an organic electronic element formed on the substrate;
 a side sealing layer on the periphery of the substrate and surrounding the side of the organic electronic element; and
 the composition according to claim 1.

19. The organic electronic device according to claim 18, further comprising a top sealing layer covering the entire surface of the organic electronic element, wherein the top sealing layer and the side sealing layer are present on the same plane.

20. A method for preparing an organic electronic device, comprising steps of:
 applying the composition of claim 1 on the periphery of a substrate on which an organic electronic element is formed, so as to surround the side of the organic electronic element; and
 curing the composition.

* * * * *